(12) United States Patent
Allen

(10) Patent No.: US 12,246,824 B2
(45) Date of Patent: Mar. 11, 2025

(54) NOSE WHEEL STEERING SYSTEMS AND METHODS

(71) Applicant: GOODRICH CORPORATION, Charlotte, NC (US)

(72) Inventor: Jason Bradley Allen, Waco, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 621 days.

(21) Appl. No.: 17/549,144

(22) Filed: Dec. 13, 2021

(65) Prior Publication Data

US 2023/0182891 A1 Jun. 15, 2023

(51) Int. Cl.
| | |
|---|---|
| *B64C 25/50* | (2006.01) |
| *F15B 11/036* | (2006.01) |
| *F15B 15/06* | (2006.01) |
| *F16H 19/04* | (2006.01) |
| *F16H 55/26* | (2006.01) |

(52) U.S. Cl.
CPC ............ *B64C 25/50* (2013.01); *F15B 11/036* (2013.01); *F15B 15/065* (2013.01); *F16H 19/04* (2013.01); *F16H 55/26* (2013.01)

(58) Field of Classification Search
CPC ....... F16H 55/26; B64C 25/50; B64C 25/505; F15B 11/036; F15B 15/065
See application file for complete search history.

(56) References Cited

U.S. PATENT DOCUMENTS

| | | | |
|---|---|---|---|
| 3,151,533 A | 10/1964 | Hartel | |
| 3,401,577 A | 9/1968 | Patridge | |
| 4,610,411 A | 9/1986 | Veaux et al. | |
| 4,629,026 A | 12/1986 | Estela Rosell | |
| 5,251,717 A * | 10/1993 | Klosterhaus | B62D 5/12 180/428 |
| 10,196,135 B2 | 2/2019 | Quenerch'Du et al. | |
| 10,287,003 B2 * | 5/2019 | La Commara | F15B 15/1452 |
| 2021/0245869 A1 | 8/2021 | Acks et al. | |

FOREIGN PATENT DOCUMENTS

FR 2910425 6/2008

OTHER PUBLICATIONS

European Patent Office, European Search Report dated May 3, 2023 in Application No. 22211014.0.

* cited by examiner

*Primary Examiner* — Kevin Hurley
*Assistant Examiner* — Hosam Shabara
(74) *Attorney, Agent, or Firm* — SNELL & WILMER L.L.P.

(57) ABSTRACT

A rack assembly for a rack and pinion gear system may comprise: a rack housing; and a rack disposed within the rack housing, the rack and the rack housing at least partially defining a first hydraulic chamber disposed between a first side of the rack and the rack housing, a second hydraulic chamber disposed between a second side of the rack and the rack housing, a third hydraulic chamber disposed within the rack proximal the first hydraulic chamber, and a fourth hydraulic chamber disposed within the rack proximal the second hydraulic chamber.

14 Claims, 5 Drawing Sheets

SECT A-A

NOSE WHEEL STEERING SYSTEMS AND METHODS

FIELD

The present disclosure relates generally to landing gear systems and, more particularly, to nose landing gear systems with power steering.

BACKGROUND

Landing gear assemblies typically comprise a shock strut assembly coupled to a wheel axle having one or more wheels. Steering systems may include push-pull hydraulic cylinders connected to the steering collar via lugs on a lower strut cylinder. A pilot may provide a steering command signal, which commands a steering system, resulting in axle rotation.

SUMMARY

A rack assembly for a rack and pinion gear system is disclosed herein. The rack assembly may comprise: a rack housing; and a rack disposed within the rack housing, the rack and the rack housing at least partially defining a first hydraulic chamber disposed between a first side of the rack and the rack housing, a second hydraulic chamber disposed between a second side of the rack and the rack housing, a third hydraulic chamber disposed within the rack proximal the first hydraulic chamber, and a fourth hydraulic chamber disposed within the rack proximal the second hydraulic chamber.

In various embodiments, the rack is configured to translate in a first direction in response to receiving a first hydraulic pressure in the first hydraulic chamber and the fourth hydraulic chamber. The rack may be configured to translate in a second direction in response to receiving a second hydraulic pressure in the second hydraulic chamber and the third hydraulic chamber. The first direction may be opposite the second direction.

In various embodiments, the rack assembly further comprises a piston disposed within the rack, the piston disposed between the third hydraulic chamber and the fourth hydraulic chamber. The rack assembly may further comprise a first hollow rod extending from a first end of the rack housing to the piston and a second hollow rod extending from the piston to a second end of the rack housing. The first hollow rod may be configured to fluidly couple a hydraulic pump to the third hydraulic chamber, and wherein the second hollow rod is configured to fluidly couple the hydraulic pump to the fourth hydraulic chamber.

A rack assembly for a rack and pinion gear system is disclosed herein. The rack assembly may comprise: a rack housing extending from a first end to a second end; a rack disposed in the rack housing; a first hydraulic chamber defined axially between the first end and the rack; a second hydraulic chamber defined axially between the rack and the second end; a piston disposed within the rack; a first hollow rod extending from the first end to the piston, the first hollow rod configured to supply a first hydraulic pressure to a third hydraulic chamber disposed within the rack; and a second hollow rod extending from the piston to the second end, the second hollow rod configured to supply a second hydraulic pressure to a fourth hydraulic chamber disposed within the rack.

In various embodiments, the rack is configured to translate relative to the piston.

In various embodiments, the rack assembly further comprises a first end cap coupled to the rack and at least partially defining the first hydraulic chamber and the third hydraulic chamber. The piston may at least partially define the third hydraulic chamber and the fourth hydraulic chamber. The rack assembly may further comprise a second end cap coupled to the rack and at least partially defining the fourth hydraulic chamber and the second hydraulic chamber.

In various embodiments, the rack is configured to translate in a first direction in response to receiving the first hydraulic pressure in the first hydraulic chamber and the fourth hydraulic chamber. The rack may be configured to translate in a second direction in response to receiving the second hydraulic pressure in the second hydraulic chamber and the third hydraulic chamber.

A steering system is disclosed herein. The steering system may comprise: a pinion; a rack operatively coupled to the pinion, the rack disposed in a rack housing; a first hydraulic chamber disposed between a first end of the rack housing and the rack; a second hydraulic chamber disposed between a second end of the rack housing and the rack, the second end opposite the first end; a third hydraulic chamber disposed within the rack; and a fourth hydraulic chamber disposed within the rack between the third hydraulic chamber and the second hydraulic chamber.

In various embodiments, the rack translates toward the second end of the rack housing in response to pressurizing the first hydraulic chamber and the fourth hydraulic chamber. The rack may translate towards the first end of the rack housing in response to pressurizing the second hydraulic chamber and the third hydraulic chamber. The pinion may rotate in response to the rack translating.

In various embodiments, the steering system further comprises a collar coupled to an outer cylinder, the collar operably coupled to the pinion. The collar and the pinion may form a beveled gear interface, and the rack and the pinion form a rack and pinion interface.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein refers to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

A steering system is disclosed herein. The steering system comprises an outer cylinder, a pinion, collar, and a rack assembly. The rack assembly may be aligned vertically and/or horizontally. The rack assembly may be operatively coupled to the pinion. The collar may be coupled to the outer cylinder. When the pinion is rotated by a steering input device (e.g., a rack assembly), there may be an angular multiplication of the input resulting a mechanical advantage greater than a 1:1 ratio. In doing so, the steering input device may have shorter travel and/or allow for a smaller steering input device. In various embodiments, the rack assembly may include a steering range and a castor range. The rack and pinion assembly may disengage from interfacing teeth from the collar when the collar is in the castor range.

Figure 1:
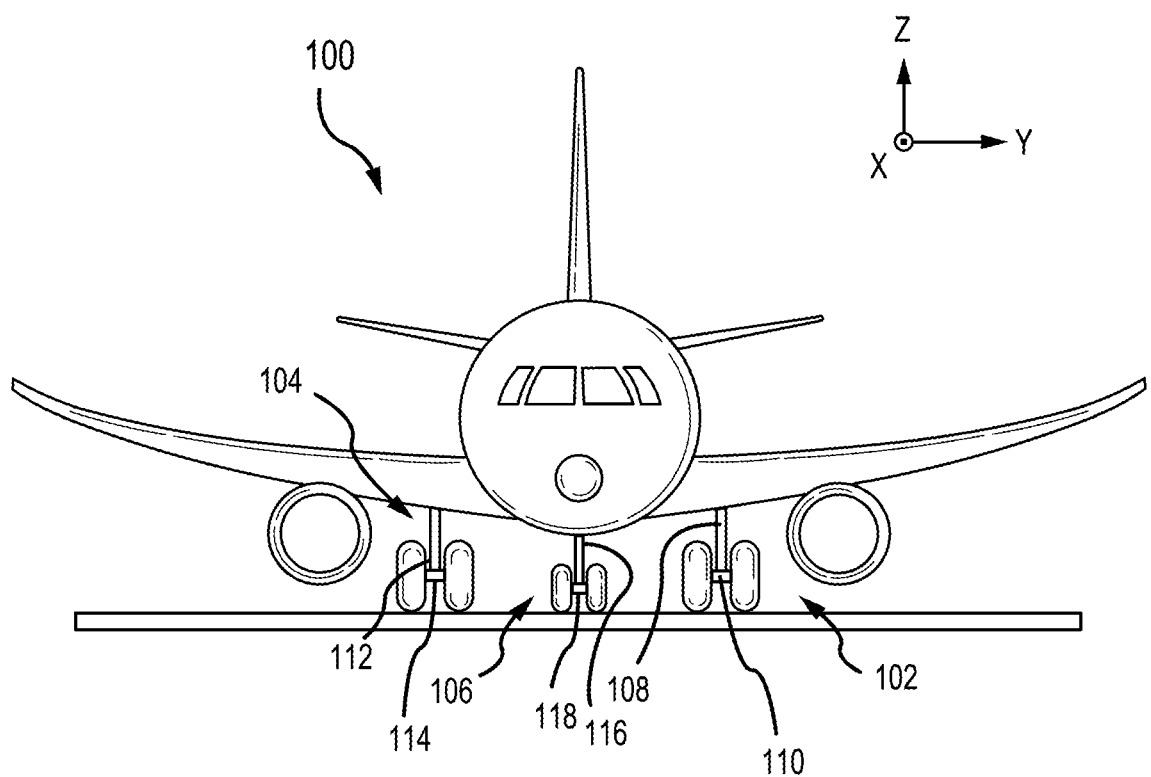
FIG. 1 illustrates an aircraft in accordance with various embodiments.

Referring now to FIG. 1, an aircraft 100 is illustrated. In accordance with various embodiments, the aircraft 100 may include one or more landing gear assemblies, such as, for example, a left landing gear assembly 102 (or port-side landing gear assembly), a right landing gear assembly 104 (or starboard-side landing gear assembly) and a nose landing gear system 106. Each of the left landing gear assembly 102, the right landing gear assembly 104 and the nose landing gear system 106 may support the aircraft 100 when not flying, allowing the aircraft 100 to taxi, takeoff and land, safely and without damage to the aircraft. In various embodiments, the left landing gear assembly 102 may include a left shock strut assembly 108 and a left wheel assembly 110, the right landing gear assembly 104 may include a right shock strut assembly 112 and a right wheel assembly 114 and the nose landing gear system 106 may include a nose shock strut assembly 116 and a nose wheel assembly 118.

Figure 2:
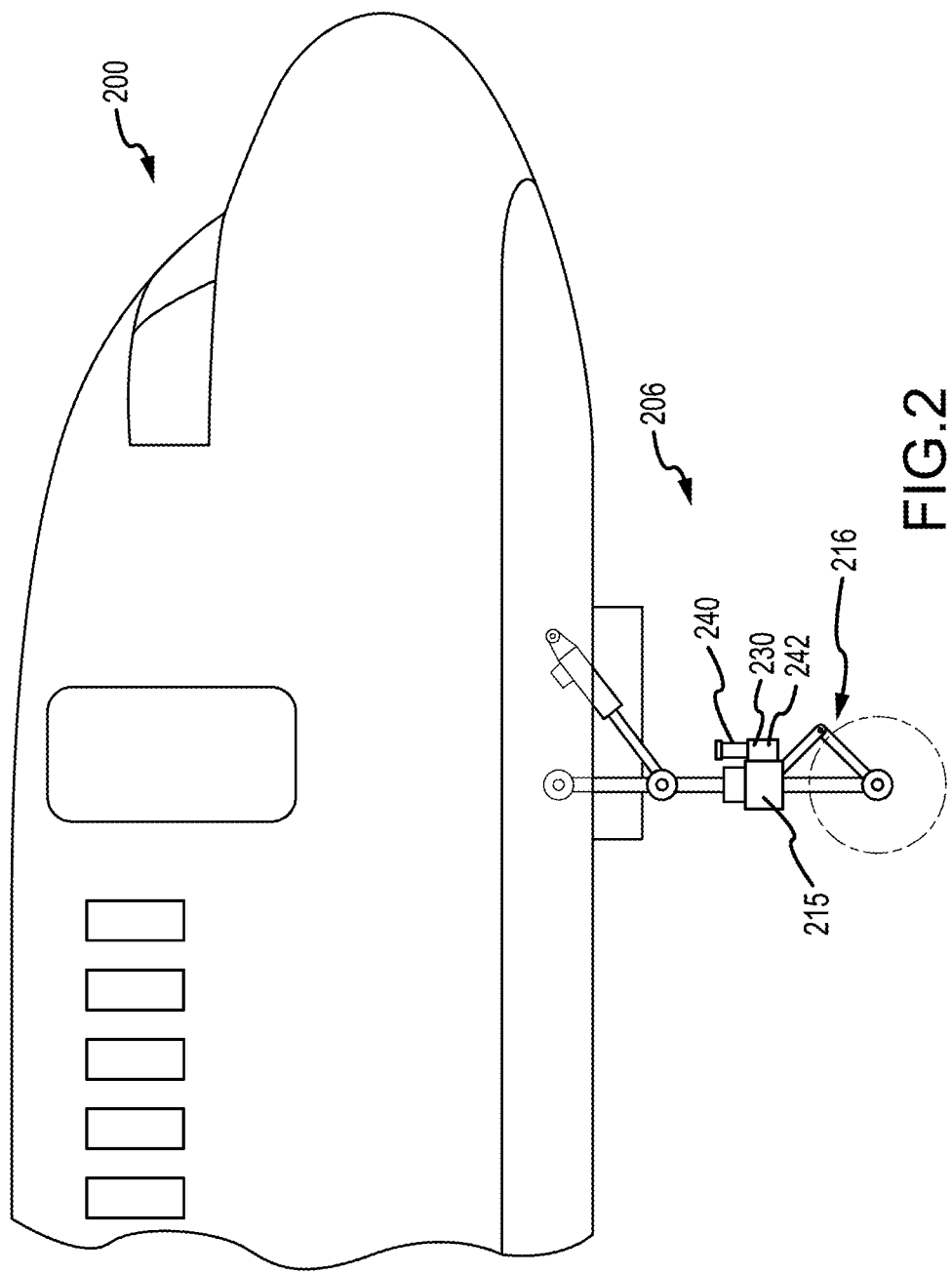
FIG. 2 illustrates an aircraft having a nose landing gear system, in accordance with various embodiments.

With reference to FIG. 2, an aircraft 200 having a nose landing gear system 206 is illustrated, in accordance with various embodiments. The nose landing gear system 206 includes a steering actuator 230. The steering actuator 230 is connected to a steering collar 215 that is itself connected to a nose shock strut assembly 216 and configured to steer the nose landing gear system 206. In various embodiments, the steering actuator 230 comprises a steering power source 240 (e.g., hydraulic pump or an electric motor). The steering actuator 230 may further comprise a rack assembly 242 configured to transmit power provided by the steering power source 240 to the steering collar 215 in order to steer the aircraft 200. In various embodiments, the combination of the steering power source 240 and the rack assembly 242 comprise an electro-mechanical actuator assembly, a hydraulic actuator assembly, or the like connected to steering collar 215 and the nose shock strut assembly 216 and configured to steer the aircraft 200.

Figure 3:
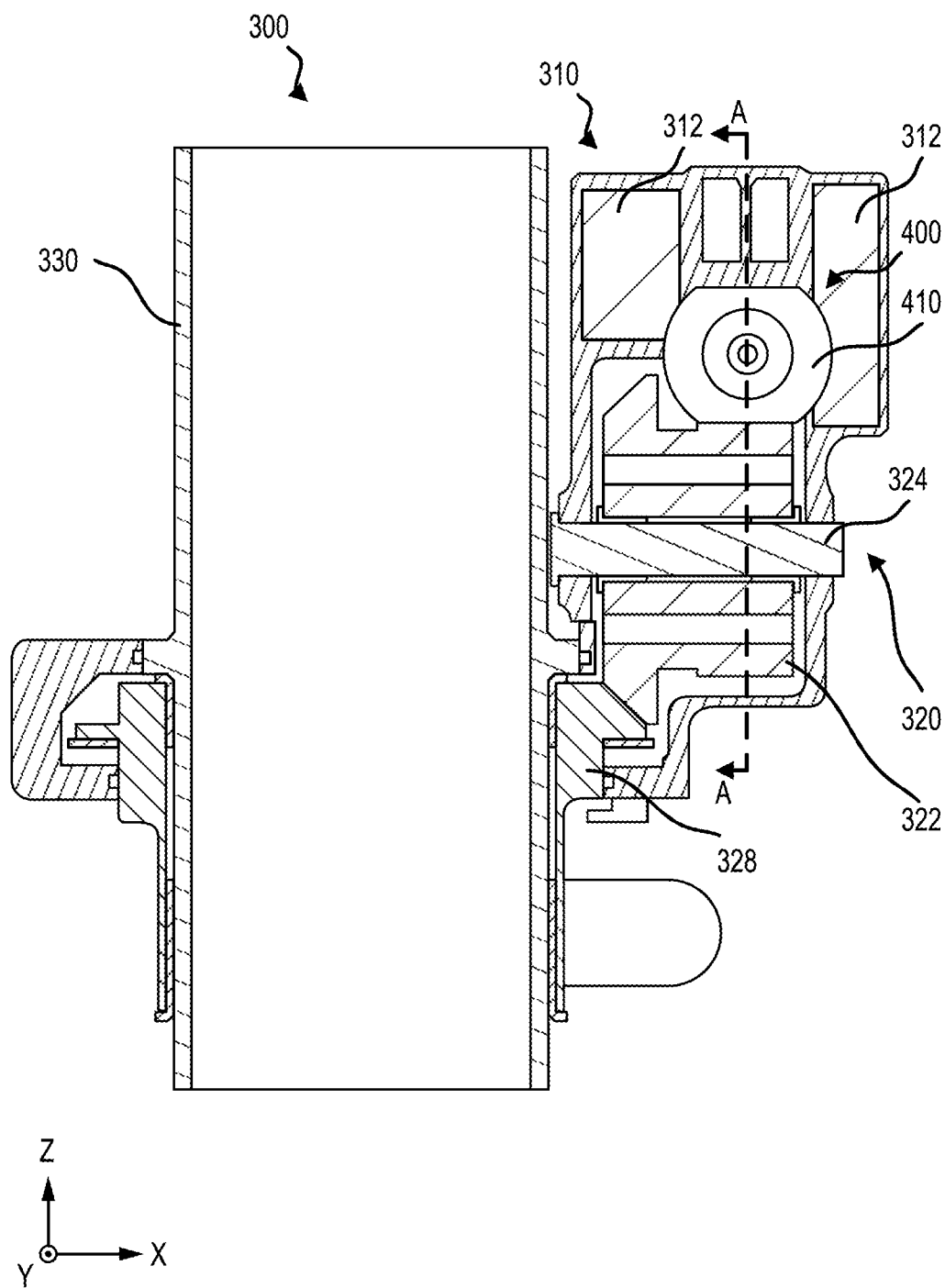
FIG. 3 illustrates a cross-sectional view of a steering system, in accordance with various embodiments.
Figure 4:
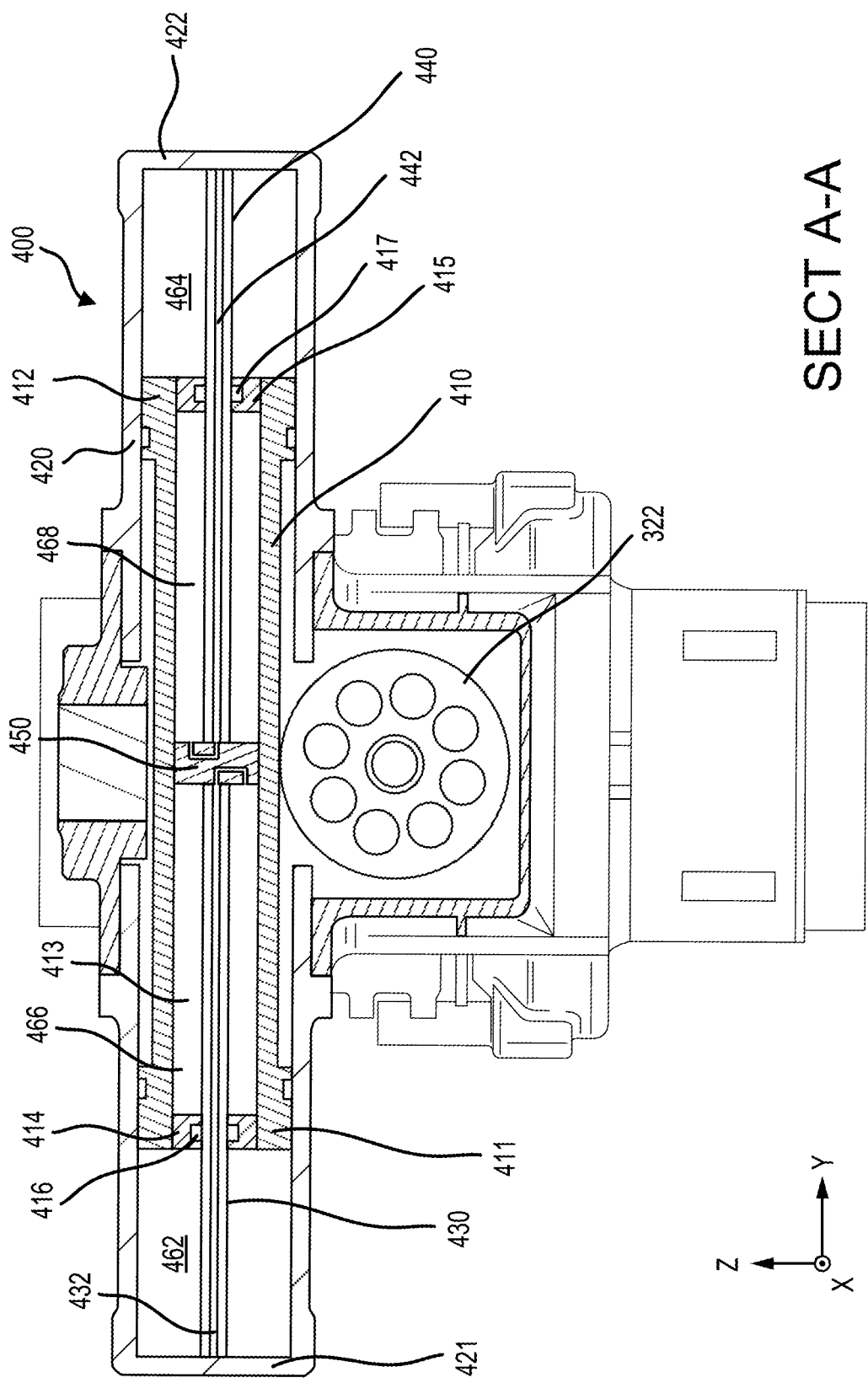
FIG. 4 illustrates a cross-sectional view of a steering system, in accordance with various embodiments.

Referring now to FIGS. 3 and 4, a steering system 300, in accordance with various embodiments, is illustrated. The steering system 300 may be a nose landing gear steering system or the like. The steering system 300 comprises a rack assembly 400, a steering housing 310, a gear assembly 320, and an outer cylinder 330.

In various embodiments, the gear assembly 320 comprises a pinion 322 and a shaft 324. The shaft 324 extends through, and is coupled to, the steering housing 310. The pinion is operatively coupled to a rack 410 in the rack assembly 400. In this regard, the rack 410 and the pinion 322 form a rack and pinion gear. Thus, the pinion 322 is configured to rotate about a centerline defined by the shaft 324 in response to linear actuation of a rack 410 in the rack assembly 400. Similarly, the pinion 322 is operatively coupled to a collar 328. In this regard, the collar 328 is configured to rotate about a centerline defined by the outer cylinder 330 in response to rotation of the pinion 322 about the centerline of the shaft 324.

In various embodiments, the collar 328 is coupled to a radially outer surface of the outer cylinder 330. The collar 328 may be fixedly coupled to the outer cylinder 330 by bushings, or the like.

In various embodiments, the steering housing 310 comprises a manifold 312. The manifold 312 may be in fluid communication with a hydraulic pump as described further herein.

Referring now to FIG. 4 only, a cross-sectional view along section A-A from FIG. 3 is illustrated, in accordance with various embodiments. The rack assembly 400 comprises the rack 410, a rack housing 420, hollow rods 430, 440, and a piston 450. The rack 410 extends laterally (i.e., in the −Y-direction) from a first end 411 to a second end 412. The rack 410 at least partially defines a bore 413 extending through the rack 410 (i.e., extending from the first end 411 to the second end 412. The rack 410 further comprises a first end cap 414 disposed at the first end 411 and a second end cap 415 disposed at the second end 412.

In various embodiments, the piston 450 is disposed axially between the first end cap 414 and the second end cap 415. The first hollow rod 430 is fixedly coupled to, and extends from (i.e., in a lateral direction, or axial direction, Y-direction), a first end 421 of the rack housing 420 to the piston 450. Similarly, the second hollow rod 440 is fixedly coupled to, and extends from (i.e., in a lateral direction, or axial direction, Y-direction), the piston 450 to a second end 422 of the rack housing.

The rack assembly 400 disclosed herein comprises hydraulic chambers 462, 464, 466, and 468. The hydraulic chamber 462 is defined axially between the first end 421 of the rack housing and the first end cap 414 of the rack and radially between a radially outer surface of the first hollow rod 430 and a radially inner surface of the rack housing 420. Similarly, the hydraulic chamber 464 is defined axially between the second end cap 415 of the rack 410 and the second end 422 of the rack housing 420 and radially between a radially outer surface of the second hollow rod 440 and a radially inner surface of the rack housing 420.

The hydraulic chamber 466 is defined axially between the first end cap 414 and the piston 450 and radially between the radially outer surface of the first hollow rod 430 and a radially inner surface of the rack 410. Similarly, the hydraulic chamber 468 is defined axially between the piston 450 and the second end cap 415 and radially between the radially outer surface of the second hollow rod 440 and the radially inner surface of the rack 410.

In various embodiments, each hydraulic chamber (e.g., hydraulic chambers 462, 464, 466, 468) is fluidly isolated from the other hydraulic chambers. For example, the first end cap 414 is fixedly coupled to the rack 410 and contains a dynamic seal 416 disposed in a groove defined by the first end cap 414 and configured to fluidly isolate hydraulic chamber 462 from hydraulic chamber 466. Similarly, the second end cap 415 is fixedly coupled to the rack 410 and contains a dynamic seal 417 disposed in a groove defined by the second end cap 415 and configured to fluidly isolate the hydraulic chamber 464 from the hydraulic chamber 468.

The hydraulic chambers 466, 468 are fluidly isolated via the piston 450. For example, with brief reference to FIG. 5, a detail view of the piston 450 within the rack 410 is illustrated, in accordance with various embodiments. In various embodiments, a dynamic seal 452 is disposed in a groove extending radially inward from a radially outer surface of the piston 450. The dynamic seal 452 is configured to fluidly isolate the hydraulic chamber 466 from the hydraulic chamber 468.

Figure 5:
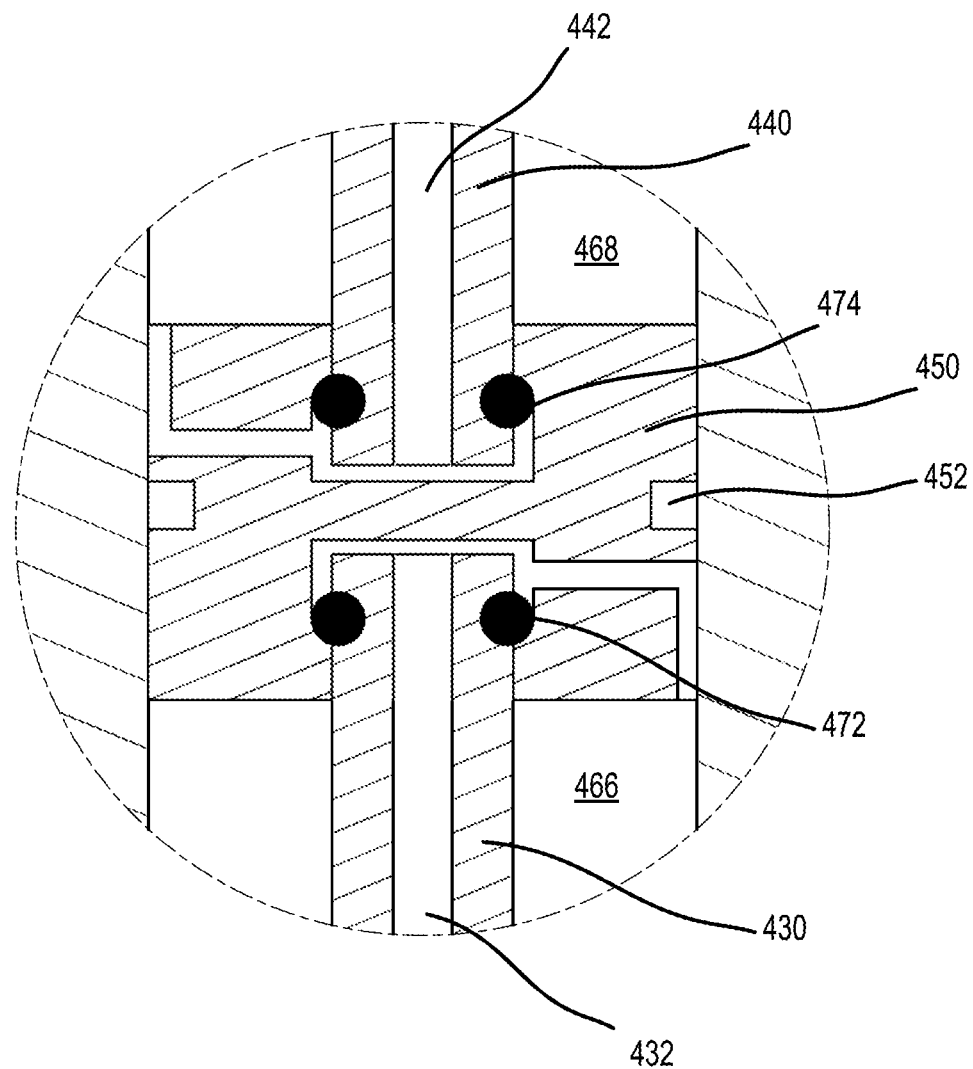
FIG. 5 illustrates a detail view of a portion of a steering system, in accordance with various embodiments.

Referring now to FIGS. 4 and 5, the first hollow rod 430 defines a fluid passage 432 configured to be in fluid communication with the hydraulic chamber 466 and the manifold 312 from FIG. 3. Similarly, the second hollow rod 440 defines a hollow passage 442 configured to be in fluid communication with the hydraulic chamber 468 and the manifold 312 from FIG. 3.

In various embodiments, the first hollow rod 430 is coupled to the piston 450 in tension in response to hydraulic chamber 466 being pressurized. Similarly, the second hollow rod 440 is coupled to the piston 450 in tension in response to hydraulic chamber 468 being pressurized. In this regard, the first hollow rod 430 and the second hollow rod 440 may be alternately in tension during operation of the rack assembly 400 during normal operation. Thus, buckling concerns of the first hollow rod 430 and second hollow rod 440 may be eliminated, in accordance with various embodiments since some axial play exists between the piston 450 and the first and second hollow rods 430 and 440. In this regard, a rod outer diameter for the hollow rods 430, 440 may be minimized to increase a total working area of the rack assembly 400. In various embodiments, shear ring 472 may be disposed radially between the first hollow rod 430 and a mating surface of the piston 450. Similarly, shear ring 474 may be disposed radially between the second hollow rod 440 and the piston 450.

Referring now to FIG. 4, in order to steer the collar 328 from FIG. 3 for a right turn (i.e., in the positive Y-direction with respect to FIG. 4), the hydraulic chamber 462 and the hydraulic chamber 468 are pressurized (e.g., via a hydraulic pump). In response to pressurizing the hydraulic chamber 462 and the hydraulic chamber 468, the rack 410 translates laterally in the positive Y-direction. The rack 410 translates laterally relative to the rack housing 420, the piston 450, and the hollow rods 430, 440, which remain stationary during the maneuver. Via a rack and pinion gear system, the pinion 322 rotates clockwise in response to translation of the rack 410 in the positive Y-direction, which in turn rotates the collar 328 of FIG. 3 about the Z axis.

In order to steer the collar 328 from FIG. 3 for a left turn (i.e., in the negative Y-direction with respect to FIG. 4), the hydraulic chamber 464 and the hydraulic chamber 466 are pressurized (e.g., via a hydraulic pump). In response to pressurizing the hydraulic chamber 464 and the hydraulic chamber 466, the rack 410 translates laterally in the negative Y-direction. Via the rack and pinion gear system, the pinion 322 rotates counterclockwise in response to translation of the rack 410 in the negative Y-direction, which in turn rotates the collar 328 of FIG. 3 about the Z axis In various embodiments, a total working area for hydraulic pressure may be increased by approximately 30% (e.g., total work area in hydraulic chamber 462+total work area in hydraulic chamber 468 is approximately 30% greater than a rack assembly having only solid rack (e.g., only two hydraulic chambers).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rack assembly for a rack and pinion gear system, the rack assembly comprising:
    a rack housing;
    a rack disposed within the rack housing, the rack and the rack housing at least partially defining a first hydraulic chamber disposed between a first side of the rack and the rack housing, a second hydraulic chamber disposed between a second side of the rack and the rack housing, a third hydraulic chamber disposed within the rack proximal the first hydraulic chamber, and a fourth hydraulic chamber disposed within the rack proximal the second hydraulic chamber;
    a piston disposed within the rack, the piston disposed between the third hydraulic chamber and the fourth hydraulic chamber, wherein the first hydraulic chamber, the second hydraulic chamber, the third hydraulic chamber, and the fourth hydraulic chamber are each fluidly isolated from one another.

2. The rack assembly of claim 1, wherein the rack is configured to translate in a first direction in response to receiving a first hydraulic pressure in the first hydraulic chamber and the fourth hydraulic chamber.

3. The rack assembly of claim 2, wherein the rack is configured to translate in a second direction in response to receiving a second hydraulic pressure in the second hydraulic chamber and the third hydraulic chamber.

4. The rack assembly of claim 3, wherein the first direction is opposite the second direction.

5. The rack assembly of claim 1, further comprising a first hollow rod extending from a first end of the rack housing to the piston and a second hollow rod extending from the piston to a second end of the rack housing.

6. The rack assembly of claim 5, wherein the first hollow rod is configured to fluidly couple a hydraulic pump to the third hydraulic chamber, and wherein the second hollow rod is configured to fluidly couple the hydraulic pump to the fourth hydraulic chamber.

7. A rack assembly for a rack and pinion gear system, the rack assembly comprising:
    a rack housing extending from a first end to a second end;
    a rack disposed in the rack housing;
    a first hydraulic chamber defined axially between the first end and the rack;
    a second hydraulic chamber defined axially between the rack and the second end;
    a third hydraulic chamber disposed within the rack;
    a fourth hydraulic chamber disposed within the rack;
    a piston disposed within the rack;
    a first hollow rod extending from the first end to the piston, the first hollow rod configured to supply a first hydraulic pressure to the third hydraulic chamber
    a second hollow rod extending from the piston to the second end, the second hollow rod configured to supply a second hydraulic pressure to the fourth hydraulic chamber;
    a first end cap coupled to the rack and at least partially defining the first hydraulic chamber and the third hydraulic chamber; and
    a second end cap coupled to the rack and at least partially defining the fourth hydraulic chamber and the second hydraulic chamber, wherein:
        the piston at least partially defines the third hydraulic chamber and the fourth hydraulic chamber, and
        the rack is configured to translate in a first direction in response to receiving the first hydraulic pressure in the first hydraulic chamber and the fourth hydraulic chamber.

8. The rack assembly of claim 7, wherein the rack is configured to translate in the first direction relative to the piston.

9. The rack assembly of claim 8, wherein the rack is configured to translate in a second direction in response to receiving the second hydraulic pressure in the second hydraulic chamber and the third hydraulic chamber.

10. A steering system, comprising:
    a pinion;
    a rack operatively coupled to the pinion, the rack disposed in a rack housing;
    a piston disposed within the rack;
    a first hydraulic chamber disposed between a first end of the rack housing and the rack;
    a second hydraulic chamber disposed between a second end of the rack housing and the rack, the second end opposite the first end;
    a third hydraulic chamber disposed within the rack;
    a fourth hydraulic chamber disposed within the rack between the third hydraulic chamber and the second hydraulic chamber;
    a first end cap coupled to the rack and at least partially defining the first hydraulic chamber and the third hydraulic chamber; and
    a second end cap coupled to the rack and at least partially defining the fourth hydraulic chamber and the second hydraulic chamber, wherein:
        the piston at least partially defines the third hydraulic chamber and the fourth hydraulic chamber, and
        the rack translates toward the second end in response to pressurizing the first hydraulic chamber and the fourth hydraulic chamber.

11. The steering system of claim 10, wherein the rack translates toward the first end of the rack housing in response to pressurizing the second hydraulic chamber and the third hydraulic chamber.

12. The steering system of claim 11, wherein the pinion rotates in response to the rack translating.

13. The steering system of claim 10, further comprising a collar coupled to an outer cylinder, the collar operably coupled to the pinion, the collar configured to rotate relative the outer cylinder.

14. The steering system of claim 13, wherein the collar and the pinion form a beveled gear interface, and wherein the rack and the pinion form a rack and pinion interface.

* * * * *